April 18, 1933.  C. W. RICE  1,904,534
SOUND WAVE SYSTEM
Filed March 16, 1932
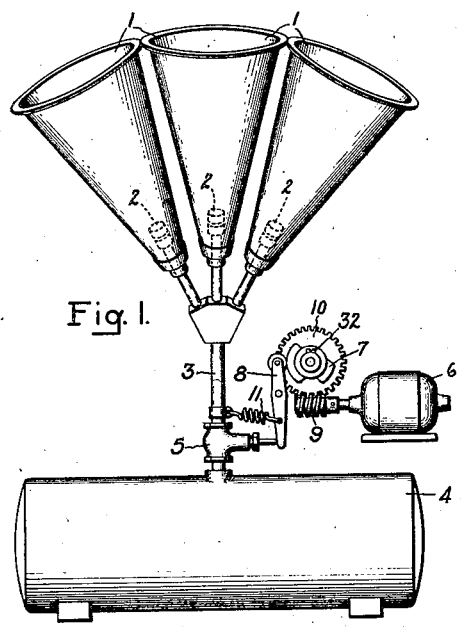
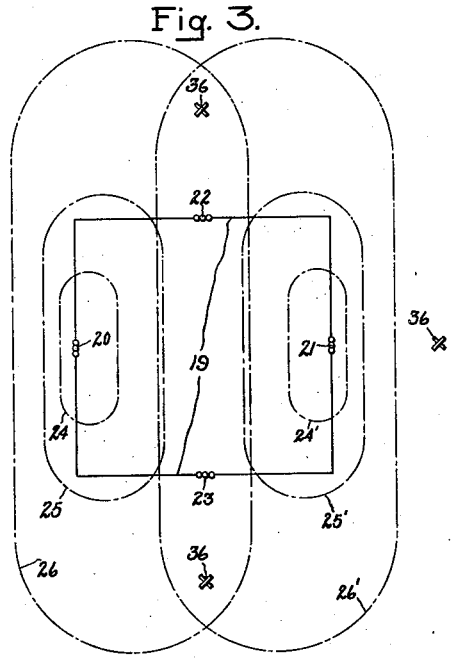
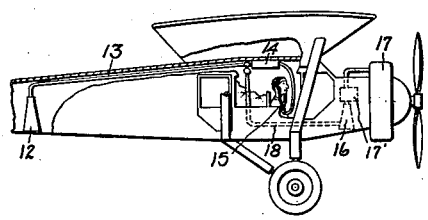
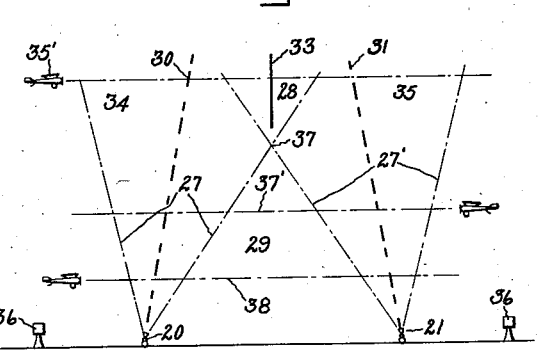
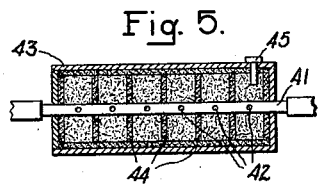
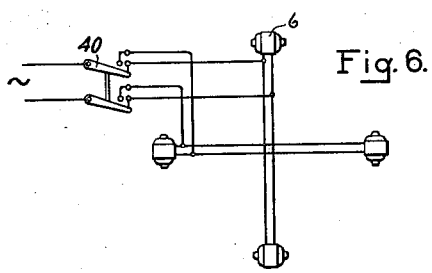
Inventor:
Chester W. Rice,
by
His Attorney.

Patented Apr. 18, 1933

1,904,534

UNITED STATES PATENT OFFICE

CHESTER W. RICE, OF SCHENECTADY, NEW YORK, ASSIGNOR TO GENERAL ELECTRIC COMPANY, A CORPORATION OF NEW YORK

SOUND WAVE SYSTEM

Application filed March 16, 1932. Serial No. 599,162.

My invention relates to sound wave systems and more particularly to systems for guiding aircraft in landing.

It has for one of its objects to provide a simple system which may be economically installed and maintained at aircraft landing fields and which furnishes, by the medium of sound waves transmitted into the space above the field, a satisfactory guide to aircraft during the landing operation.

A further object of my invention is to provide a system in which a plurality of well defined regions extending across the field are marked out to the craft by the medium of sound waves, whereby the pilot of a craft in landing may receive the indications necessary to enable him to land on a safe portion of the field.

A further object of my invention is to provide means whereby the boundaries are definitely marked at relatively low altitudes and throughout a large portion of the length thereof.

Still another object of my invention is to provide a system of the type indicated whereby the pilot in a wide range of different altitudes in landing is provided with an approximate indication of his altitude above the field.

Still another object of my invention is to provide a system of the type indicated employing sound waves of high frequency.

In carrying my invention into effect distinctively modulated sound waves are transmitted in fan-shaped sheets extending into space above the landing field from a number of points about the field. These sheets are so directed that in a certain region extending across the field sound waves from a plurality of said points about the field are received whereas in other regions lying along the sides of said first region sound waves from only a single point are received, while in the region close to the ground and directly over the field no sound waves are received. The operator in a craft traversing the various regions over the field may then satisfactorily ascertain by the signals produced in the various regions his location relative to the field and also his approximate altitude above the field.

By properly shifting the points about the field from which sound waves are transmitted, or by selectively controlling the character of the sound waves transmitted from the different points, the various regions of sound waves above the field may be so controlled as to guide the approaching craft to the field in a proper direction to facilitate a safe landing, as during varying wind conditions.

In my copending application, Serial No. 461,620 filed June 16, 1930, and entitled Sound wave apparatus, is disclosed a system for determining altitude from aircraft by means of sound waves, and particularly sound waves of high frequency. These high frequency sound waves are transmitted from the craft toward the ground and the echo received upon the craft. The time interval between the transmission of the impulse and receipt of its echo serves as an indication of altitude. One of the objects of my present invention is to provide improved means located at the landing field which may be utilized in conjunction with the acoustic or sonic altimeter, of my above application, which may comprise the standard equipment of the craft and whereby when the craft reaches the region of the field it may be guided to a safe landing by use of this equipment. It is contemplated that the craft will be guided to the region of the field by radio beacons, or suitable other long range equipment. At the field the operator will utilize his sonic altimeter in conjunction with the sonic equipment located at the field to locate the exact position to effect a safe landing. At the same time that the operator is ascertaining this location with respect to the field he also receives an approximate indication of his altitude.

The novel features which are believed to be characteristic of my invention are set forth with particularity in the appended claims. My invention itself, however, both as to its organization and method of operation, together with further objects and advantages thereof, may best be understood by reference to the following description taken in connection with the accompanying drawing, in which Fig. 1 represents a sound wave transmitter of a type which I prefer to employ; Fig. 2 indicates an aircraft provided with sound wave receiving equipment; Figs. 3 and 4 indicate diagrammatically a field equipped with my invention and indicate the various sound wave regions above the field produced by the equipment employed; Fig. 5 indicates an acoustic filter which is employed in the equipment shown in Fig. 2; and Fig. 6 shows a system of electrical connections for the sound wave transmitters.

Referring to Fig. 1 of the drawing, I have shown therein three sound wave megaphones 1 arranged side by side in a common plane and with their vertex portion in proximity to each other, thereby to transmit a fan-shaped beam of sound. Of course as many of the megaphones as desired may be included in any transmitter. Suitably arranged within each of the megaphones is a high frequency whistle diagrammatically indicated at 2. Each of these whistles is arranged to be supplied through a conduit 3 with a suitable gas, or air, under pressure from a tank 4. The tank 4 may of course be supplied with the gas employed under pressure in any desired way. A control valve 5 is arranged in the conduit 3 and operated by a suitable motor 6 through a cam and rider arrangement 7, 8 whereby the transmitted sound waves are modulated in a desired manner. The shaft of the motor 6 is provided with a worm 9 which cooperates with the worm gear 10 mounted upon the shaft of the cam 7 whereby the cam is rotated by the motor. The rider 8 has the form of a lever pivoted near its center joint, one end of which is biased against the cam by means of a spring 11 connected between the opposite end and the conduit. The opposite end of this lever cooperates with the valve 5 in such a way as to control the supply of gas to the whistles 2 in accordance with the shape of the cam 7. It will be observed that in the arrangement shown in Fig. 1 the cam 7 comprises two projecting portions which are relatively widely separated at one side and closely spaced at the other whereby as the rider 8 falls into the spaces between the two projecting portions sound waves are transmitted from the megaphones in the form of a dot and dash.

The receiving system which may be used in connection with my present invention may comprise the sound wave receiving portion of the sonic altimeter disclosed in the above mentioned copending application or equipment provided especially for use in connection with my present invention.

This arrangement is conventionally indicated in Fig. 2 as mounted upon an aircraft. The receiving megaphone 12 is arranged at the rear of the craft and sound waves received therein are supplied through a conduit 13 and an acoustic filter 14 to a stethoscope 15 worn by the operator. The transmitting means used in the sonic altimeter is also conventionally indicated in Fig. 2 by the megaphone 16 which contains a whistle operated by gas derived from one of the cylinders of the engine 17. The whistle is periodically impulsed by means of an impulsing device represented in the drawing by the rectangle 17′. The transmitting megaphone and receiving apparatus of the altimeter are interconnected by an acoustic channel 18 for purposes which I have fully described in my copending application Serial No. 532,006, filed April 22, 1931, and entitled Sound wave apparatus.

The manner in which I employ the arrangement shown in Figs. 1 and 2 is best illustrated in Figs. 3 and 4. In Fig. 3, I have indicated by the rectangle 19 a landing field. One of the transmitting arrangements shown in Fig. 1 is indicated by three adjacent small circles at the center of each of the boundaries of the field, these transmitters being designated by the reference numerals 20, 21, 22 and 23. While these transmitters are shown directly at the centers, and upon the boundaries of the field that may of course be located in any desired position but are arranged to transmit a sheet of sound waves into the space above the field, the sheet preferably extending directly across the field. The manner in which these sound waves are directed into the space above the field is best indicated by the lines 24, 25, 26; and 24′, 25′, 26′ of Fig. 3, and the lines 27 and 27′ of Fig. 4. The lines 24, 25 and 26, and 24′, 25′ and 26′ are drawn to indicate the cross-sectional area in the horizontal plane at different altitudes of the sheet of sound transmitted by each of the transmitters 20 and 21, and similarly the lines 27 and 27′ of Fig. 4 are drawn to indicate the cross-sectional area of each of these sheets of sound waves in a vertical plane at the transmitters. It will be observed that each of the transmitters 20 and 21 is inclined at a suitable angle to the vertical so that the sheets of sound waves are directed at a corresponding angle, the angle being so chosen that the sheets of sound waves transmitted from opposite sides of the field coincide in a region high above the field, as at 28, whereas these sheets are separated by the region 29 at lower altitudes below the region 28.

In Fig. 4, I have indicated by the dash dot and dot dash lines 30 and 31 the signals which are transmitted from each of the different transmitters 20 and 21. Of course the signals transmitted by each of the transmitters may be varied in accordance with the form of the cam 7 and may be exactly timed with respect to the signals transmitted by the opposite transmitter by proper adjustment of the cam 7 upon the shaft and control of the speed of the motors. For this purpose synchronous alternating current motors preferably are employed and adjusting means such as a set screw 32 (Fig. 1) are used whereby the cams are properly positioned relative to each other upon the respective shafts. Thus if the cam 7 of the transmitter 20 be arranged to transmit a dash dot signal the corresponding cam of transmitter 21 may be arranged to transmit a dot dash signal, these signals being so correlated that when received in the common region 28 high above the field they blend together and form a continuous uninterrupted tone as indicated by the continuous line 33 in Fig. 4. It will thus be observed that in the region 28 high above the field a signal is produced which is different from that produced in the regions 34 and 35 at either side thereof. Thus the operator of a craft traversing these regions may readily determine his location with respect to the field. In the region 29 no signals are produced although at either side of this region the corresponding dot dash and dash dot signals are received.

As an illustration of the utility of my invention let us suppose that a craft indicated at 35' is flying in the fog high above the field, after having been guided to the region of the field by, for example, radio beacons indicated in the drawing at 36. By employing beacons of the equisignal type the craft may be guided over the center of the field by this means. By listening at the stethoscope of the sonic altimeter, the transmitter of which is idle, the operator first receives the dash dot signal from the transmitter 20. Continuing at his same altitude he soon receives a continuous tone signal which in a short period of time changes to a dot dash signal. This informs him that he is at an altitude above a certain fixed altitude corresponding to the point 37 of Fig. 4 which may be an altitude of known height in any particular field. A more accurate indication of his altitude is obtained by observation of the relative periods during which he receives the various signals. The craft will then turn about and fly directly back upon the same course but at a lower altitude as indicated at 37'. He now first receives the dot dash signal, then no signal at all, and then the dash dot signal, which again tells him that he is directly crossing the field, and which again furnishes him with an approximate indication of his altitude. He then again turns about and traverses the field at an altitude indicated at 38, thereby receiving the signals for a short period at each boundary of the field but finding a wide region between the two signals where no signal is received. This furnishes him with a very satisfactory indication of the extent of and exact location of the field. He can then come down to a safe altitude where the field can be seen and a landing may be effected by eye even under conditions of poor visibility.

In case of extremely poor visibility such that a landing cannot be effected by sight as above even after a low altitude has been attained, the operator may then make use of the transmitting mechanism of the sonic altimeter and obtain more accurate indications of altitude by observing the time interval between the transmitted impulses and the echo received in the receiving megaphone, all as more particularly described in my above-mentioned copending applications. That is, the operator, with the transmitter of the sonic altimeter idle, finds his way down by signals received from transmitters 20 and 21 as above described, until an altitude is reached, such as is indicated at 38 in the drawing, or lower. He then has a definite indication of the extent of the field and the location of its boundaries. After turning about at the end of the field, he starts the transmitter of the sonic altimeter and approaches the field while observing the altitude by the echo method. At the boundary of the field he receives a definite indication from the ground transmitter. He then cuts off the engine of the craft and glides downward by the indications furnished by the altimeter until the transmitted sound wave impulse and received echo appear to blend, when he operates his controls to settle to the ground at the proper point on the field.

It is important in the practical application of my invention that the sound waves be transmitted in sheets substantially as shown and described. In this way the common region 28 above the field where signals are received from both transmitters 20 and 21 is substantially of prism shape extending entirely across the field and somewhat beyond. At the same time it is sufficiently narrow in the direction of flight to constitute a definite indication of the location of the center of the field, this indication becoming increasingly definite as the ground is approached. The regions 34 and 35 on opposite sides of this common region 28 are also long in a direction across the field and relatively narrow in the direction of flight, these regions constituting indications of the location of the boundaries of the field which become increasingly definite as the lower altitudes are approached. Because of the fan-shaped nature of these regions a good indication of the location of the boundary is produced along a large portion of the length thereof at relatively low altitudes. The pilot therefore is not required to search a particular spot, or narrow region, on the field although he is guided laterally toward the center of the field to a sufficient extent to assure a landing on the safe portion thereof. For example, if a craft in landing is too far at one side or the other of the portion of the field where a safe landing may be effected he will miss the proper signals and will therefore ascend and maneuver about until he again obtains the signals after which he will try a lower altitude. Due to the width of the different sheets this maneuvering is not difficult. The absence of signals prevents the pilot from coming down in a position other than a proper one for landing. In this way the pilot is enabled to feel his way down with the aid of the sound signals to an altitude where a landing may be effected upon a safe portion of the field.

The cams 7 on the transmitters 20 and 21 may of course be interchanged in such a way as to direct the pilot to the field from the proper direction with respect to the wind. For example, if it is desired that the craft land from the west, the pilot will be told by radio or otherwise to land after passing the dash dot signal. This may be his standard instructions. If he is to land from the east then transmitter 21 will be arranged to transmit the dash dot signal whereas the transmitter 20 will transmit the dot dash signal. If it is desired that the pilot land from the north or south the transmitters 20 and 21 will not be utilized but instead the transmitters 22 and 23 will be used. These transmitters may be arranged to transmit the same signals transmitted by transmitters 20 and 21 if desired or different signals, as for example, dash dot dot and dot dot dash, whereby corresponding indications are produced. The type of signal received may in this way be used to indicate to the pilot the direction from which he is to land. Preferably the signals transmitted from the opposite sides of the field are complementary in nature and form a distinctive signal, preferably a continuous uninterrupted tone, in the region 28 high above the field.

The arrangement whereby the different transmitters may be selected for operation is shown in Fig. 6 in which the motors 6 of the various transmitters are conventionally indicated, the opposite pairs of motors being connected to be supplied with alternating current through a three way switch 40. The motors 6 are of the synchronous type whereby the cams 7 of opposite transmitters are as previously explained maintained in accurate synchronism. In case, however, after a number of operations they get out of synchronism, synchronism may again be restored by proper adjustment of one of the cams upon the shaft.

In certain situations, particularly where it is not desired to use the radio beacons to lay out a course across the field, it may be desirable to use all of the transmitters 20, 21, 22, and 23 at one time. This may be effected by operating the switch of Fig. 40 to the middle position where all of the motors are connected to the source. Fan-shaped sheets of sound are then transmitted upward from all sides of the field. The different sheets of sound are distinctively modulated as above described, transmitters 20 and 21 transmitting the dash dot and dot dash signals and transmitters 22 and 23 transmitting the dot dot dash and dash dot dot signals. All of these signals combine high over the field to produce the continuous tone thereby definitely marking that region of the field. The region over each boundary is similarly distinctively marked by the signal of its own transmitter whereas the region of low altitudes over the field is marked by absence of signals although it is marked on all four sides by distinct signals. Thus the operator may readily find a true course across the center of the field and is aided in finding the proper lateral position by the lateral transmitters. Properly the pilot, in any case, will keep track of his compass readings while maneuvering about to aid in crossing the field in the proper direction although a good indication is furnished by the duration and location of the various sound signals.

The use of the four sheets of sounds may be particularly desirable in connection with craft of the autogyro type, for example. The region of no sound signals can readily be found particularly with this slow moving type of craft and when found the craft may settle to the ground in its characteristically steep way.

It is of great importance in a system of the type described that sound waves utilized be of such character that they may be readily distinguished upon the craft from sounds which may be produced either by the craft upon which the sound waves are received, or other craft about the landing field. For this purpose I prefer to employ sound waves having a frequency of from 2000 to 4000 cycles. The sound waves should be sufficiently high readily to be distinguished from other sound waves produced and at the same time should not be so high that the ear is insensitive to them. A frequency of 3000 cycles may be very satisfactorily employed. The acoustic altimeter which may be utilized in connection with my invention includes an acoustic filter, which I have shown in Fig. 5, which highly attenuates sound waves of low frequency and permits the efficient transmission from the megaphone 12 to the stethoscope 15 of sound waves of the frequency employed. This filter comprises a small pipe 41 of about 3/8" or 1/2" in diameter having disposed along the length thereof a number of openings 42 these openings being small bores in the wall of the pipe whereby a plurality of series and shunt connected air passages are formed causing the filter to offer a low shunt impedance to sound waves having the frequency of the principal sounds to be suppressed, such for example those frequencies between 100 and 300 cycles, and at the same time to offer a high shunt impedance to the passage of sound waves having the frequency of sound produced by the whistles 2. These openings in addition to attenuating undesired frequencies serve to prevent large amplitude low frequency sound waves from forcing their way through the passage leading to the stethoscope and offer a passage for the escape of air which may be received in the megaphone 12 when abrupt pressure increases occur due to atmospheric variations about the craft. The filter is preferably enclosed within a suitable acoustic housing 43, this housing being lined with felt and divided into compartments by means of felt partitions 44, each compartment being arranged to receive sound through one of the openings 42. This compartment is vented at 45 to permit the escape of air which enters the compartment through the openings 42. The compartments between the partitions 44 are filled with suitable damping material such as cotton waste, the whole body comprising means whereby extraneous sounds about the cabin of the craft are prevented from entering the sound wave channel through the openings in the filter.

The use of sound waves of high frequency is of additional importance in connection with my invention in that the transmitting and receiving megaphones may be made more directive at these frequencies. Thus these megaphones may have dimensions large as compared with a wave length employed. The diameter of the base of these megaphones may for example be equal to two or three times the wave length of the sound waves employed while the length of the cones may be two or three times the diameter of the base. The desired directivity may therefore readily be secured. The directivity of the transmitting megaphones permits of more satisfactory definition of the various regions above the field and therefore of greater facility in locating the landing position.

While I have shown a particular embodiment of my invention it will of course be understood that I do not wish to be limited thereto since many modifications may be made both in the instrumentalities employed and the method of their use, and that I contemplate by the appended claims to cover all such modifications as fall within the true spirit and scope of my invention.

What I claim as new and desire to secure by Letters Patent of the United States, is:

1. The method of marking out a landing field to aircraft which includes transmitting sound waves upward into the space above a boundary of said landing field and so directing said waves that a sheet of sound waves is produced in space above and along said boundary.

2. The method of marking out a landing field to aircraft which includes transmitting a sheet of sound waves upward into the space above the boundaries of the landing field to be marked and distinctively modulating the sound waves transmitted upward along the different boundaries in accordance with the boundaries marked.

3. The method of guiding aircraft to a landing field which includes transmitting a sheet of sound waves upward from opposite boundaries of said field, said sheets extending along the respective boundaries, distinctively modulating said sheets and so directing said sheets that they coincide in a region over the field which in its lower portion is relatively long and narrow and extends crosswise of the field.

4. The method of guiding aircraft to a landing field which includes transmitting a sheet of sound waves upward from each of two opposite sides of the field, said sheets extending longitudinally of the respective boundaries and so directing said sheets that they coincide in a prism-shaped region extending across the field, and are non-coincident in long narrow regions extending across the field on opposite sides of said prism-shaped region.

5. A sound wave boundary marker for landing fields comprising a sound wave transmitter arranged at a point near the boundary to be marked, said transmitter comprising means to generate sound waves of high frequency, and means to direct said sound waves from said point in a fan-shaped sheet, said sheet extending along the boundary to be marked.

6. A sound wave boundary marker for landing fields comprising a sound wave transmitter arranged at a point near the boundary to be marked, said transmitter comprising means to generate sound waves, and means to direct said sound waves from said point in a fan-shaped sheet, said sheet extending along the boundary to be marked and being relatively wide as compared with its thickness at a low altitude whereby the operator of a craft flying through said sheet at said low altitudes may receive a definite indication of the location of the boundary along a large portion of the length thereof.

7. The combination, in a boundary marker for aircraft landing fields, a plurality of megaphones arranged at a point near said boundary and in a common plane, the vertex portion of said megaphones being closely spaced together, whereby a fan-shaped sheet of sound may be transmitted from said point upward and along said boundary and a sound generator arranged in each of said megaphones.

8. In a system for guiding aircraft to a landing field, the combination of a plurality of sound wave transmitters, said transmitters being located respectively near opposite boundaries of said field and arranged to transmit a sheet of sound waves upward into a region of space along said opposite boundaries, means for interrupting the sound waves transmitted from each of said transmitters and means for correlating the operation of said last means to produce a distinctive signal in the region of high altitudes where sound waves from both of said transmitters are present.

9. In a system for guiding aircraft to a landing field, the combination of a plurality of sound wave transmitters, said transmitters being located respectively near opposite boundaries of said field and arranged to transmit a sheet of sound waves upward into a region of space along said opposite boundaries, said regions being increasingly coincident in a region over said field of increasing altitudes, and increasingly separated in a region over said field of diminishing altitudes, means for so controlling said transmitters as to produce complementary signals in the respective regions and a distinctive signal in the coincident region whereby the operator of a craft flying in said regions may ascertain his relative position and altitude with respect to said field.

10. In a system for guiding aircraft to a landing field, the combination of a plurality of pairs of transmitters arranged in proximity respectively to the different pairs of opposite boundaries of said field, means for operating the transmitters of each pair to produce distinctive signals, and means whereby the different pairs of transmitters may be selectively operated.

11. In a system for guiding aircraft to a landing field, the combination of a pair of sound wave transmitters, said transmitters being arranged at opposite points on said landing field, said transmitters being directed to transmit sound waves upward into individual regions above said field and into an additional common region, means for modulating said sound waves transmitted by the different transmitters and means for adjusting said last means to cause said transmitters to produce complementary signals in the individual regions and a distinctive signal in said common region.

12. The method of guiding aircraft from the earth which includes transmitting sound waves from the earth having a frequency substantially higher than the principal sounds produced about the craft, and selectively receiving said sound waves upon the craft while excluding sound waves produced about the craft.

13. The method of guiding aircraft to a landing field which includes directively transmitting high frequency sound waves of different character into different predetermined regions over said field and into a common region, whereby said different regions and said common region are defined from each other and selectively receiving said waves upon the craft to be guided while excluding sound waves of low frequency.

14. The combination in a system for guiding aircraft to a landing field, of a plurality of sound wave transmitters, said transmitters being arranged at opposite sides of said field and directed at a common region above said field, means to modulate each of said transmitters in accordance with a predetermined signal and in such a way that a different signal is produced in said common region from that transmitted by either of said transmitters.

In witness whereof I have hereunto set my hand.

CHESTER W. RICE.